No. 714,683. Patented Dec. 2, 1902.
H. P. EWELL.
WIRE FENCE.
(Application filed June 7, 1902.)
(No Model.)
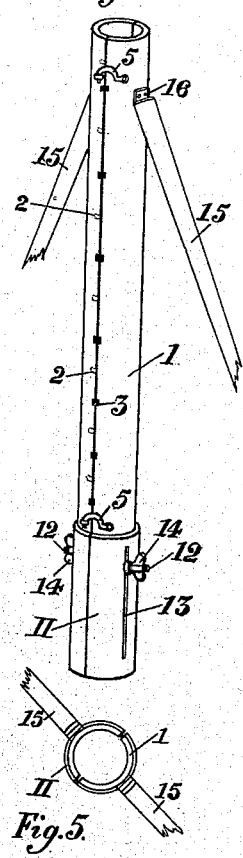
Fig. 1.
Fig. 5.
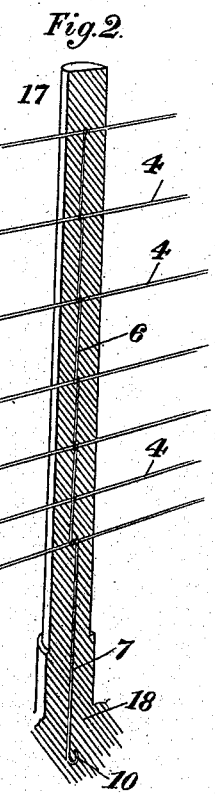
Fig. 2.
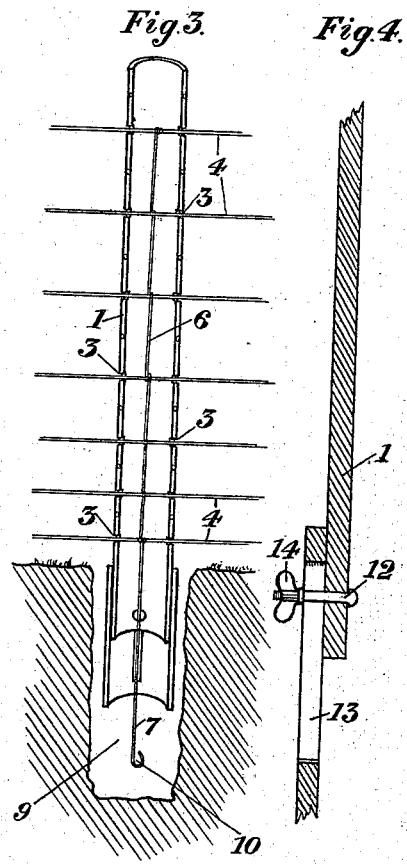
Fig. 3. Fig. 4.
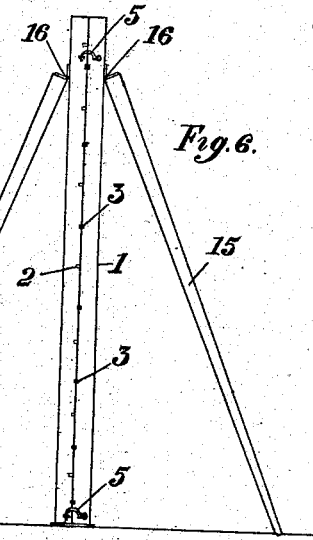
Fig. 6.
WITNESSES.
C. R. Davis
E. J. Kim
INVENTOR.
H. P. Ewell.
By R. B. Wheeler & Co.
Attorneys
THE NORRIS PETERS CO., PHOTO-LITHO., WASHINGTON, D. C.

UNITED STATES PATENT OFFICE.

HERBERT P. EWELL, OF ROCHESTER, MICHIGAN, ASSIGNOR OF TWO-THIRDS TO JAMES N. EWELL AND HIRAM TUTTLE, OF ROCHESTER, MICHIGAN.

WIRE FENCE.

SPECIFICATION forming part of Letters Patent No. 714,683, dated December 2, 1902.

Application filed June 7, 1902. Serial No. 110,581. (No model.)

*To all whom it may concern:*

Be it known that I, HERBERT P. EWELL, a citizen of the United States, residing at Rochester, in the county of Oakland, State of Michigan, have invented certain new and useful Improvements in Wire Fences; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to wire fences, and has for its object the building of cement fence-posts around certain of the stay-wires and upon the lateral wires of the fence in a manner to firmly support the lateral wires and at the same time serve as a tie to unite the parts of the post and prevent dislodgment of any portion by breakage, the base of the post being connected with the upper portion through a tie-wire which is embedded therein and depends from the lower lateral wire of the fence.

The above object is attained by the structure illustrated in the accompanying drawings, in which—

Figure 1 is a perspective view of a separable mold adapted to embrace the lateral wires of the fence and to shape the cement posts around said wires. Fig. 2 is a sectional view through the post, showing the stay-wire and the lateral wires embedded therein. Fig. 3 is a view showing one half of the mold mounted upon the wires of the fence in position to receive the cement, the other half being removed. Fig. 4 is an enlarged fragmentary view in section through a portion of the bottom of the mold and the telescopic base-section attached thereto so as to enable it to be adjusted vertically. Fig. 5 is a plan view of the top of the mold. Fig. 6 is an elevation showing the hinged brace adapted to maintain the mold upright while being filled.

Referring to the characters of reference, 1 designates a mold which may be of any suitable shape, but which is shown herein as cylindrical and which is composed of two semi-cylindrical parts adapted to be united at their edges by dowel-pins 2 or other suitable means, so as to form the shape it is desired to give to the post, each of the parts of the mold being provided in its opposite edges with notches 3, through which the line-wires 4 of the fence are adapted to pass and which are spaced to correspond with the spaces between said wires. The parts of the mold are adapted to be placed upon the wires of the fence from opposite sides and when in position are maintained in place by hooks 5 or other suitable means which unite the halves of the mold. The mold is placed upon the wires of the fence, so as to embrace one of the stay-wires 6, which will extend vertically through the mold and which is preferably provided with a depending portion 7, which extends from the lower line-wire downwardly into the hole 9, in which the post is to be erected, and the lower end of said depending portion is preferably formed into a hook 10.

The lower end of the mold is provided with a separable telescopic bottom section 11, which is adapted to brace the lower end of the mold proper and is secured in place by bolts 12, which are fixed in the bottom portion of the mold and pass through vertical slots 13 in said telescopic portion, the outer ends of said bolts receiving the thumb-nuts 14, by means of which the telescopic base-section may be secured in place after vertical adjustment. This adjustable base-section serves to direct the cement into the post-hole over which the mold is placed and also provides for varying the mold in length to accommodate any height of fence and any variation in the surface of the ground.

To assist in maintaining the mold upright after being placed upon the wires of the fence, hinged braces 15 are employed, which are attached to the opposite sides of the mold by hinges 16 and are adapted to engage the ground at their lower ends, as shown in Fig. 6, by which means the mold is braced laterally and may be maintained in a vertical position.

In constructing a fence in accordance with this invention the line-wires 4 are first strung and given the requisite tension, when the mold is then placed upon the wires of the fence where it is desired to set a post so as to embrace one of the vertical stay-wires, as shown in Fig. 3, with the lower end of the mold extending into the post-hole. After the mold has been placed in position cement is poured into the upper end of the mold, which passes therethrough and fills the post-hole and afterward fills the mold, so as to embed the stay-wire therein, as well as the line-wires, as clearly shown in Fig. 2. When the cement has set, the sides of the mold are disengaged and the mold removed, leaving the post 17 formed upon the wires of the fence and firmly seated in the ground. The stay-wire which is attached to the line-wires of the fence and passes vertically through the center of the post effects a tying of the post together and prevents a separation of the post should it become broken, while the depending extension 7 of the stay-wire anchors the post into its own base 18 and firmly binds all parts together. The line-wires of the fence being embedded in the post and embraced by the stay-wire, which is also embedded therein, any longitudinal movement of said wires through the post is prevented.

By changing the form of the mold any desired shape may be given the post, and by varying the distances between the notches 3, that receive the line-wires, said wires may be spaced any desired distance apart.

Having thus fully set forth my invention, what I claim as new, and desire to secure by Letters Patent, is—

1. In a fence, the combination with the line-wires, of an integral cement post, said line-wires embraced by and embedded in said post and extending horizontally therethrough.

2. In a fence, the combination with the line-wires and stay-wire, of a molded post, the line-wires and stay-wire embraced by and embedded in said post, the stay-wire extending vertically of the post and the line-wires passing horizontally therethrough.

3. In a fence, the combination of the plastic posts, the continuous line-wires common to all of the posts, a stay-wire for each post, said wires embraced by and embedded in said posts, the line-wires extending horizontally therethrough, and the stay-wires extending vertically thereof, and a depending wire extending downwardly into the base of the post, substantially set forth.

4. The combination of the lateral wires of the fence, the vertical stay-wires tying said lateral wires together, an anchor-wire depending from the lower lateral wire, a cement fence-post, said wires embraced by and embedded in said post, the anchor-wire and stay-wire extending vertically of the post from the base to the top, and the lateral wires extending transversely therethrough.

In testimony whereof I sign this specification in the presence of two witnesses.

HERBERT P. EWELL.

Witnesses:
 E. S. WHEELER,
 C. E. DAVIS.